United States Patent [19]

Morimoto et al.

[11] Patent Number: 4,670,345
[45] Date of Patent: Jun. 2, 1987

[54] INFORMATION RECORDING MEDIUM

[75] Inventors: Isao Morimoto; Kazuyoshi Itagaki; Koichi Mori, all of Fuji, Japan

[73] Assignee: Asahi Kasei Kogyo Kabushiki Kaisha, Osaka, Japan

[21] Appl. No.: 831,577

[22] Filed: Feb. 21, 1986

[30] Foreign Application Priority Data

Feb. 22, 1985 [JP] Japan .................................. 60-33779
May 13, 1985 [JP] Japan .................................. 60-100875
May 13, 1985 [JP] Japan .................................. 60-100876
Dec. 25, 1985 [JP] Japan .................................. 60-290692

[51] Int. Cl.$^4$ ...................... B05D 1/36; G01D 15/24; G01D 9/00
[52] U.S. Cl. .................. 428/411.1; 430/945; 346/76 L; 346/135.1; 346/137
[58] Field of Search ...................... 430/945; 346/135.1, 346/137.1, 76 L; 428/411.1

[56] References Cited

U.S. PATENT DOCUMENTS

| | | |
|---|---|---|
| 3,971,874 | 7/1976 | Ohta et al. . |
| 4,238,803 | 12/1980 | Terao et al. . |
| 4,241,355 | 12/1980 | Bloom et al. . |
| 4,268,575 | 5/1981 | Shinozaki et al. ................. 428/336 |
| 4,282,534 | 8/1981 | Shinozaki et al. ............... 346/135.1 |
| 4,290,075 | 9/1981 | Jacobs et al. ......................... 430/270 |
| 4,317,123 | 2/1982 | Namiki et al. .................... 346/135.1 |
| 4,433,340 | 2/1984 | Mashita et al. . |
| 4,461,807 | 7/1984 | Mori et al. ........................... 428/469 |

FOREIGN PATENT DOCUMENTS 60-157894 8/1985 Japan .
60-219646 11/1985 Japan .
60-234248 11/1985 Japan .

OTHER PUBLICATIONS

"Journal of Applied Physics" 50(11), Nov. 1979.
"Applied Physics Letters" 34(4), Feb. 1979.
"Journal of Applied Physics" 54(9), Sep. 1983.
"Applied Physics Letters" 18(6), Mar. 1971.
"Journal of Applied Physics" 54(3), Mar. 1983.

Primary Examiner—John E. Kittle
Assistant Examiner—Patrick J. Ryan
Attorney, Agent, or Firm—Birch, Stewart, Kolasch & Birch

[57] ABSTRACT

An information recording medium comprising a substrate and superimposed thereon a recording layer composed of Sb, Te and Ge has been found to be advantageously employed, because of its high thermal stability as well as high sensitivity and high S/N ratio, in a system of recording information by exposing an energy beam to a recording medium to cause the exposed areas to be different in optical extinction coefficient from the non-exposed areas.

22 Claims, 14 Drawing Figures

INFORMATION RECORDING MEDIUM

The present invention relates to an information recording medium. More particularly, the present invention is concerned with an information recording medium for use in an information recording system in which information is recorded by exposing a recording medium to an energy beam such as a laser beam to cause the exposed areas to be different in an optical extinction coefficient from the non-exposed areas, and the recorded information is read out by utilizing the difference in the optical extinction coefficient between the exposed areas and the non-exposed areas.

The information recording medium of the present invention is excellent in thermal stability as well as in sensitivity and S/N ratio (signal-to-noise ratio).

An information recording system, which is well known, is a heat mode system in which information is recorded in the form of pits in a recording medium by selective ablation of the recording medium irradiated spotwise with a focused laser beam or the like having high intensity or large energy. In this system, the readout of the recorded information is effected by utilizing the reflectivity difference between the ablated areas and the non-ablated areas of the recording medium. The recording medium used in the heat mode system generally comprises a substrate and formed thereon a recording layer made of a low-melting metal such as Te, Bi, alloys containing Te or Bi, Te compounds or Bi compounds (see U.S. Pat. Nos. 4,433,340, 4,238,803 and 4,241,355; J. Appl. Phys. 50(11) November 1979, P6881; and Appl. Phys. Lett. 34, 1979, P275).

The disadvantages of the above-mentioned heat mode system is that irregularities or disorders are caused in shape or profile of pits or holes formed in the recording layer of the recording medium, leading to poor S/N ratio. The reason for this is as follows. In the heat mode system, not only temperature elevation but also melting and dispersion or evaporation of the metal constituting the recording layer take place in forming pits in the recording layer of a recording medium. The viscosity of the metal of the recording layer when molten, and surface tension of the metal when molten and dispersed greatly affect the shape of pits formed upon irradiation with a laser beam. However, difficulties are encountered to control the viscosity and surface tension of the metal, causing the shape of pits to be controlled with great difficulties. Further, in the heat mode system, small pieces of metal often remains undispersed within the formed pits, causing noise and error rate to be increased.

On the other hand, there is known another information recording system in which information is recorded by exposing a recording layer formed on a substrate to an energy beam such as laser beam to cause the exposed areas to be different in optical constant from the non-exposed areas, and the recorded information is read out by utilizing the difference in optical constant between the exposed areas and the non-exposed areas. Hereinafter, this system is often referred to as "optical constant change system", and the areas of the recording medium of which the optical constant has been changed by exposure to an energy beam is often referred to as "bits".

In the optical constant change system, information is recorded without any ablation of the recording layer, i.e. without formation of pits in the recording layer. Therefore, the optical constant change system is free from the problems accompanying the above-mentioned heat mode system, such as irregularities or disorders in shape or profile of the pits formed in the recording layer of the recording medium and poor S/N ratio and high error rate attributable to the presence of metal pieces remaining undispersed in the formed pits. For the optical constant change system, there have been proposed various recording media, e.g. a recording medium comprising a substrate and formed thereon a recording layer composed of fine particles of Te dispersed in $TeO_2$, a recording medium comprising a substrate and formed thereon a recording layer having a two-layer structure of $Sb_2Se_3$-$Bi_2Te_3$, and the like (see U.S. Pat. No. 3,971,874; J. Appl. Phys. 54(9) September 1983, P5376; and Appl. Phys. Lett. 18, 1971, P256). However, the above-mentioned conventional recording media for use in the optical constant change system are poor in thermal stability, and, hence, cannot be advantageously used for practical purposes.

As described in J. Appl. Phys. 54(3), March 1983, P1256–1260, $Sb_2Te_3$ exhibits a great degree of change in transmittance when heated. Therefore, a recording medium comprising $Sb_2Te_3$ for use in the optical constant change system is expected to have a high S/N ratio. In fact, such recording medium is excellent in S/N ratio as well as in sensitivity. However, the recording medium comprising $Sb_2Te_3$ has also been regarded as unsuitable for practical uses, because the transmission of the recording medium changes unfavorably at a low temperature, leading to an extremely poor thermal stability.

As is apparent from the foregoing, the optical constant change system is advantageous in eliminating the drawbacks of the heat mode system but has a serious drawback that the conventionally proposed recording media for use therein are poor in thermal stability. Accordingly, under such circumstances, there is a strong demand in the art to develop a thermally stable information recording medium for use in the optical constant change system without sacrificing a high sensitivity and a high S/N ratio.

The present inventors have made extensive and intensive studies to improve the thermal stability of recording medium for use in the optical constant change system comprising Sb and Te which is excellent in sensitivity and S/N ratio. As a result, the present inventors have surprisingly found that a recording medium containing Ge in addition to Sb and Te is extremely excellent in thermal stability while maintaining a high sensitivity and a high S/N ratio. The present invention has been made based upon such a novel finding.

It is, therefore, an object of the present invention to provide an information recording medium (hereinafter often referred to simply as "recording medium") for use in the optical constant change system which is excellent in thermal stability as well as in sensitivity and S/N ratio.

The foregoing and other objects, features and advantages of the present invention will be apparent to those skilled in the art from the following detailed description and appended claims taken in connection with the accompanying drawings in which:

In FIGS. 11 to 14, like portions are designated by like numerals.

According to the present invention, there is provided an information recording medium for use in a system of recording information by exposing to an energy beam a medium comprising a substance capable of changing in optical extinction coefficient upon being heated, causing the exposed areas to be different in optical extinction coefficient from the non-exposed ares, which comprises a substrate and superimposed thereon a recording layer composed of Sb, Te and Ge.

The information recording medium of the present invention is for use in a system for recording information by exposing to an energy beam a medium comprising a substance capable of changing in optical extinction coefficient (hereinafter often referred to simply as "extinction coefficient") upon being heated, causing the exposed areas to be different in optical extinction coefficient from the non-exposed areas.

The information recording in the recording medium is preferably effected by heating the recording medium using an energy beam such as laser beam, electron beam or the like. The above-mentioned energy beam is forcusable on a small spot and has a high degree of heating effect, enabling the information to be densely recorded in the recording medium with high sensitivity.

The readout of the recorded information may be carried out by applying to the recording medium a laser beam whose intensity is lower than the intensity required to record the information in the recording medium, and detecting the difference in reflectivity between the formed bit portions and the other portions of the recording medium. Alternatively, the readout of the recorded information may be carried out by utilizing the difference in transmittance between the formed bit portions and the other portions of the recording medium.

Figure 11:
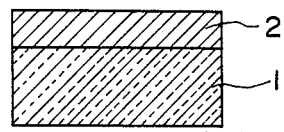
FIG. 11 is a cross-sectional view of one form of a recording medium according to the present invention.

Referring now to FIG. 11, there is shown a cross-sectional view of one form of a recording medium of the present invention which comprises a substrate 1 and superimposed thereon a recording layer 2.

Figure 12:
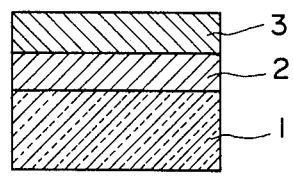
FIG. 12 is a cross-sectional view of another form of a recording medium according to the present invention.

FIG. 12 shows a cross-sectional view of another form of a recording medium of the present invention which comprises a substrate 1 and, superimposed on the substrate in the following order, a recording layer 2 and a reflective layer 3.

Figure 13:
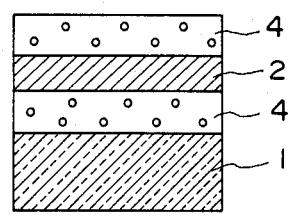
FIG. 13 is a cross-sectional view of still another form of a recording medium according to the present invention.

FIG. 13 shows a cross-sectional view of still another form of a recording medium of the present invention which comprises a substrate and, superimposed on the substrate in the following order, a layer 4 of a metallic compound (hereinafter referred to as "metallic compound layer"), a recording layer 2 and another metallic recording layer 4.

Figure 14:
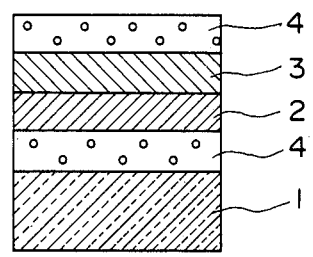
FIG. 14 is a cross-sectional view of a further form of a recording medium according to the present invention.

FIG. 14 shows a cross-sectional view of a further form of a recording medium of the present invention which comprises a substrate 1 and, superimposed thereon in the following order, a metallic compound layer 4, a recording layer 2, a reflective layer 3 and another metallic compound layer 4.

As examples of the substrate used as a support for the recording medium, there may be mentioned a glass plate, a plate comprising glass and superimposed thereon a photocurable polymer layer, a film and plate of plastic materials such as polycarbonate, acrylic resin, epoxy resin and polystyrene, and a plate of an Al alloy.

Of the above-mentioned substrates, a plate comprising glass and superimposed thereon a photocurable polymer, and a transparent plastic plate of a polycarbonate, acrylic resin or epoxy resin are preferred, because an energy beam for information recording and readout of the recorded information can be irradiated through the substrate.

For practical uses, guide grooves or pits (prepits) corresponding to address signals are generally provided on the substrate. The guide grooves and pits may be prepared by an ordinary method such as photopolymer method (2P method) or injection molding.

In the recording medium of the present invention, as illustrated in FIG. 11, a recording layer 2 is provided on the substrate 1. The recording layer is composed of Sb, Te and Ge.

In the present invention, it is preferred that Sb, Te and Ge be present in the recording layer in a composition in terms of number of atoms represented by the formula:

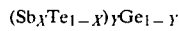

$(Sb_X Te_{1-X})_Y Ge_{1-Y}$ wherein $0.05 \leq X \leq 0.7$, more preferably $0.1 \leq X \leq 0.6$ and $0.4 \leq Y \leq 0.8$, more preferably $0.5 \leq Y \leq 0.7$.

When Sb, Te and Ge are present in the recording layer in the above-mentioned composition, the recording medium having such a recording layer is excellent in all the characteristics in respect of thermal stability, sensitivity and S/N ratio.

When in the above-mentioned formula the value of X is less than 0.05, the degree of change in extinction coefficient of the recording layer caused by heating becomes small, causing the S/N ratio of the recording medium to be lowered and, further, the thermal and humid stabilities are lowered. On the other hand, when the value of X is more than 0.7, the S/N ratio of the recording medium is lowered.

In the present invention, in the case of $0.1 \leq X \leq 0.35$, there can be attained an extremely high sensitivity.

When in the above-mentioned formula the value of Y is less than 0.4, the S/N ratio of the recording medium is lowered. On the other hand, when the value of Y is more than 0.8, tends to cause the change in extinction coefficient of the recording layer at low temperature, causing the thermal stability of the recording medium to be lowered.

In the present invention, it is preferred that in the above-mentioned formula the values of X and Y be $0.15 \leq X \leq 0.4$ and $0.5 \leq Y \leq 0.7$, respectively. The recording medium having a recording layer in which Sb, Te and Ge are present in such a composition is extremely excellent in thermal stability as well as in sensitivity and S/N ratio, and, hence, is preferable from a practical point of view, since the recorded information can be read out without lowering in S/N ratio and increase in bit error rate even in the case of a long-time readout of the recorded information in which a large amount of heat tends to be generated and accumulated in the recording medium.

The recording layer composed of Sb, Te and Ge of the recording medium according to the present invention may further contain other metals, as needed. The incorporation of a low-melting metal such as Zn, In, Cd, Sn, Se, Tl, Pb, Bi or the like is preferable for improvement of sensitivity, and the incorporation of Se for improvement of humid stability. On the other hand, the incorporation of an element, such as Au, Ag, Cu or the like, which is highly bonded metallically is effective for accelerating the rate of change in optical characteristics of the recording medium.

The recording layer composed of Sb, Te and Ge may be formed on a substrate by ordinary deposition methods such as vacuum deposition and sputtering. In the case of vacuum deposition, it is noted that, when an alloy composed of Sb, Te and Ge is employed as a deposition source for effecting deposition, the resulting film often has a composition considerably different from that of the alloy used as the source. Hence, it is preferable that the deposition be effected using three separate deposition sources respectively for Sb, Te and Ge.

When an alloy composed of Sb, Te and Ge is employed as a deposition source, the flash deposition method is more preferable than the vacuum deposition method because the smaller difference between the composition of the alloy and that of the resulting film. Further, the recording layer may be formed simply by effecting deposition using two deposition sources respectively for $Sb_2Te_3$ and Ge.

When the recording layer film is formed by vacuum deposition, the deposition is preferably effected at a deposition rate of 0.1 to 50 Å/second under a vacuum degree of $10^{-5}$ to $10^{-6}$ Torr. In this case, it is preferred that the temperature of the substrate be kept at 40° C. or less.

In the case of formation of the recording layer by the sputtering method an alloy having a predetermined composition may be used as a deposition source, because there can be formed a film having substantially the same composition as the alloy. Alternatively, the recording layer may be formed in such a manner that pieces of another metallic element or alloy is placed on the metallic element or alloy, followed by sputtering. In this method, the number of pieces and the position of the metallic element or alloy may be varied according to the composition of the film to be formed. In the case of the sputtering method, the substrate is apt to be heated during the sputtering operation, and, hence, it is preferable to sufficiently cool the substrate for formation of a film having a uniform recording characteristic.

When the recording medium of the present invention consists of a substrate and superimposed thereon a recording layer composed of Sb, Te and Ge, the thickness of the recording layer is preferably 700 Å or more, more preferably 800 Å to 2000 Å for attaining a sufficient contrast. When the recording layer is too thick, the change in physical and chemical properties which causes a change in optical extinction coefficient of the recording layer, does not occur uniformly in the direction of the thickness. In such a case, a high S/N ratio cannot be attained.

As illustrated in FIG. 12, according to the present invention, a reflective layer 3 may be provided on the recording layer 2. The reflective layer may be provided on one of the upper and lower sides of the recording layer. The recording layer and the reflective layer constitute an information supporting layer. The reflective layer is made of a metal or an alloy composed of at least two metals. In this embodiment there can be attained a high contrast of reflectivity due to a light interference effect even when the thickness of the recording layer is small, leading to a high S/N ratio. When the reflective layer is provided on the recording layer, the thickness of the recording layer is generally determined taking into consideration the material and thickness of the reflective layer, but is preferably in the range of 200 Å to 1000 Å. When an energy beam for information recording and readout of the recorded information is irradiated from the side of the substrate, the reflective layer is provided on the side of the recording layer remote from the substrate. On the other hand, when an energy beam for information recording and readout of the recorded information is irradiated from the side remote from the substrate, the reflective layer is provided between the recording layer and the substrate.

The recording medium of the present invention may generally be used in a single form. However, the recording medium of the present invention may alternatively be in a composite form, e.g. an air-sandwiched structure or entirely bonded structure as will be mentioned later so that the surface of the recording layer can be protected against danger and/or stain which is caused, for example, by direct contact of the recording layer with air or hands. Such a structure is constructed so that the side of the recording layer is on the inside of the structure. In such a case, the beam irradiation for information recording and readout of the recorded information is effected from the side of the substrate.

The reflective layer is preferably a layer made of a substance having a high extinction coefficient to an energy beam for readout of the recorded information. Specifically, it is preferred that the reflective layer be a layer of a metal selected from the group consisting of Al, Ti, Cr, Co, Ni, Se, Ge, Zr, Ag, In, Sn, Sb, Te, Pt, Au, Pb and Bi, or a layer of an alloy containing at least one metal selected from the group consisting of Al, Ti, Cr, Co, Ni, Se, Ge, Zr, Ag, In, Sn, Sb, Te, Pt, Au, Pb and Bi. It is preferred that the reflective layer be a layer of a metal selected from the group consisting of Sb, Te and Bi, or the reflective layer be a layer of an alloy containing at least one metal selected from the group consisting of Sb, Te and Bi. When the reflective layer is made of Sb, Te or Bi, or their alloys the maximum contrast can be attained with a thin recording layer and with a thin reflective layer due to their high extinction coefficients for visible ray and for infrared ray, and, at the same time, the lowering in sensitivity due to the provision of the reflective layer can be avoided since the transfer of the heat to the reflective layer can be reduced because of the low thermal conductivities of these metals and alloys. In other words, Sb, Te and Bi and their alloys are preferable as the material of the reflective layer in terms of S/N ratio and sensitivity.

The reflective layer may be a single layer structure or multiple layer structure of at least two metals or alloys as mentioned above.

The thickness of the reflective layer is preferably 100 Å or more, more preferably in the range of 100 Å to 1000 Å from a view point of sensitivity.

In the present invention, a metallic compound layer may be provided on the recording layer or the information supporting layer remote from the substrate, or between the recording layer or the information supporting layer and the substrate. Alternatively, as illustrated in FIGS. 13 and 14, a metallic compound layer 4, may be provided on both the upper and lower sides of the recording layer 2 or information supporting layer comprising the recording layer 2 and the reflective layer 3.

It is preferred that the metallic compound layer be made of at least one metallic compound selected from the group consisting of oxides or nitrides of a metal selected from the group consisting of Al, Cr, Si, Zr, Ti, Ge, Se, Te, V, Hf, La, Sm, Y, Ta and Mo. Of them, oxides or nitrides of Si are more preferred. The provision of the layer made of such a metallic compound on at least one of the upper and lower sides of the recording layer or information supporting layer serves to prevent water and oxygen from air or the substrate from invading the recording layer, thus suppressing the deterioration of the recording medium. Therefore, by the provision of the above-mentioned metallic recording layer, there can be attained an improvement in storage stability and achievability of the recording medium. Therefore, the recording medium having a metallic compound layer can be advantageously employed as a medium for recording coded digital information such as computer memories in which even a partial change in properties of the recording layer brings about a drastic increase in bit error rate. The metallic compound layer may be a single layer structure of a metallic compound or a multiple layer structure of layers of different metallic compounds. When a metallic compound layer is provided both on the upper and lower sides of the recording layer or information supporting layer, the kinds of the metallic compounds on the both sides may be the same or different from each other. A preferred thickness of the metallic compound layer is in the range of 100 Å to 5000 Å from a viewpoint of sensitivity.

The reflective layer and the metallic compound layer may be formed by the vacuum deposition method or sputtering method as in the formation of the recording layer.

In the present invention, it is preferred that the produced recording medium have been subjected to heat treatment under humid condition. The heat treatment under humid condition is effective for rendering the recording media uniform in recording characterics such as sensitivity and readout characteristics such as S/N ratio and bit error rate. Therefore, the heat treatment under humid condition of the recording media is particularly preferable in the case of the production of the recording media on a large scale. The reason why the heating treatment under humid condition contributes to an improved uniformity in the characteristics of the recording media is not yet fully elucidated but is believed to reside in that the treatment causes the recording layer to have a metastable state. As mentioned above, in preparing a recording medium of the present invention, the thin film of the recording layer is formed on a substrate by deposition. In the deposition, the material to be deposited is subjected to gasification under vacuum and then solidification on the substrate at a remarkably rapid cooling rate, unfavorably causing the resulting film to be somewhat distored and the atoms to be mutually bonded in an instable state. It is believed that the heating treatment under humid condition serves to eliminate such unfavorable factors and to convert the recording layer into a metastable state.

The heating treatment is generally effected at 40° C. to less than a temperature above which the deformation of the substrate and cohesion of the recording film occur, preferably at a temperature in the range of 40° C. to 150° C., more preferably at a temperature in the range of 40° C. to 100° C. Prolonged treatment at a low temperature over a period of 10 hours or longer is preferred rather than heat treatment at a high temperature for a short period of time. With respect to humidity, a relative humidity in the range of 50% to 98% is preferred. It is believed that by the treatment under humid condition the film of the recording layer undergoes a kind of plasticization by the absorption of water so that the atoms in the film can move easily, causing the recording layer to be converted into a metastable state.

As described before, the recording medium of the present invention may be used in a single form or a composite form. In the case of a composite form, the recording medium is used as follows. Two recording media having the same structure are put, one on the other, so that the side of the recording layer remote from the substrate of one recording medium faces the side of the recording layer remote from the substrate of the other recording medium through the medium of a spacer, arranged along the periphery of each of the recording media, and partially bonded by means of an adhesive such as epoxy type adhesive applied to both the sides of the spacer thereby to form the so-called air-sandwiched structure. Alternatively, the two recording media may be entirely bonded to each other by means of an adhesive such as hot melt adhesive with the side of the recording layer remote from the substrate of one recording layer facing the side of the recording layer remote from the substrate of the other recording medium without using a spacer to form an entirely bonded structure. Further, the recording medium of the present invention may also be a rolled sheet structure formed by making a recording medium in the form of a film and then rolling it.

As mentioned hereinabove, the recording medium of the present invention is excellent in thermal stability as well as in sensitivity and S/N ratio.

The following Examples illustrate the present invention in more detail but should not be construed as limiting the scope of the invention.

REFERENCE EXAMPLE

On slide glasses having a thickness of 1.2 mm were co-deposited Sb and Te from two heating vaporization boats respectively containing Sb and Te by the resistance heating method to form 300 Å-thick films having compositions as shown in Table 1.

TABLE 1

| | Film formed on a slide glass | |
| --- | --- | --- |
| Sample No. | Sb content (% in member of atoms) | Te content (% in number of atoms) |
| 1 | 0 | 100 |
| 2 | 15 | 85 |
| 3 | 25 | 75 |
| 4 | 35 | 65 |
| 5 | 45 | 55 |
| 6 | 55 | 45 |
| 7 | 65 | 35 |
| 8 | 75 | 25 |
| 9 | 90 | 10 |
| 10 | 100 | 0 |

Each of the samples was subjected to measurement of transmittance at a wave length of 830 nm before and after heat treatment in an oven kept at a temperature of 200° C. for about 10 minutes. With respect to each sample, the transmittance ratio [the ratio of the transmittance of the sample after heat treatment (T) to that before heat treatment (To)] was determined based on the above-obtained data. Then, there was determined the relationship between the transmittance ratio and the Sb content of the film on the slide glass. The results are shown in FIG. 1.

Figure 1:
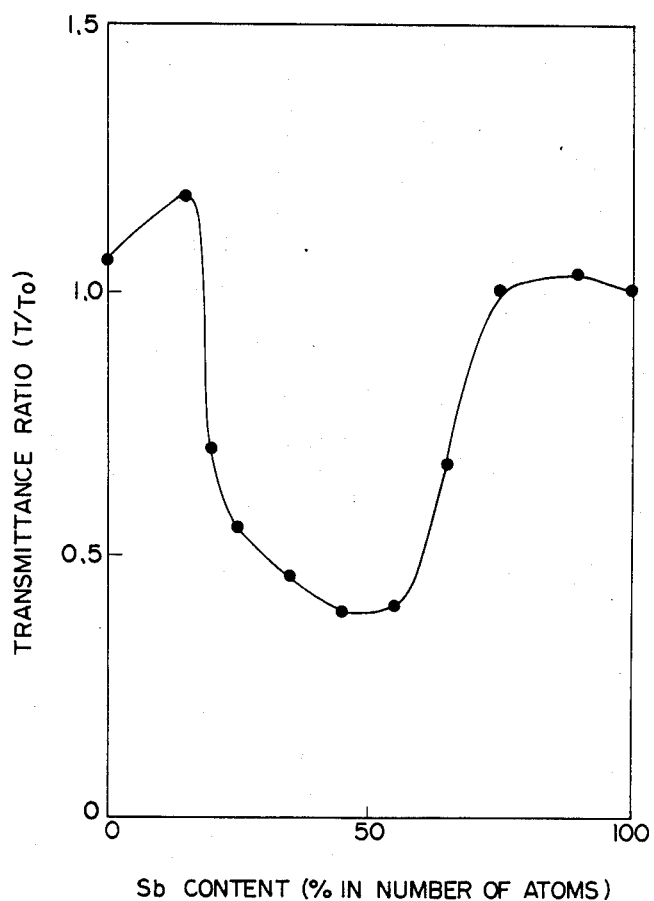
FIG. 1 is a graph showing the relationship between the transmittance ratio [the ratio of transmittance after heating (T) to that before heating (To)] and the Sb content of the recording medium obtained in Reference Example as will be given later.

As seen in FIG. 1, samples of which the films on the slide glasses have an Sb content of 20 to 70% in number of atoms exhibited a remarkable change in transmittance by heat treatment. Incidentally, the increases in transmittance by heat treatment was observed with respect to samples of which the films on the substrates have an Sb content of 20% or less. The X-ray diffraction showed that such increase in transmittance was attributable to the oxidation of Te.

EXAMPLE 1 AND COMPARATIVE EXAMPLE 1

On slide glasses having a thickness of 1.2 mm were co-deposited a $Sb_2Te_3$ alloy and a metal shown in Table 2 from two heating vaporization boats respectively containing the alloy and the metal by the resistance heating method to form 300 Å-thick films having the compositions as shown in Table 2. Thus, there were obtained Recording Media a, b, c, d and e as shown in Table 2.

Incidentally, the depositions of the films were effected under $1 \times 10^{-6}$ to $5 \times 10^{-5}$ Torr.

Substantially the same procedures as mentioned above were repeated to prepare Recording Medium f as shown in Table 2, except that only a $Sb_2Te_3$ alloy was deposited on the slide glass.

With respect to each sample, the ratio of the number of atoms of Sb to that of Te contained in the film on the slide glass was substantially 2:3.

TABLE 2

| Recording medium | | Film formed on the slide glass | | |
| --- | --- | --- | --- | --- |
| | | Metal | Alloy | Film composition |
| Comparative | a | Bi | $Sb_2Te_3$ | $(Sb_2Te_3)_{0.7}Bi_{0.3}$ |
| | b | In | " | $(Sb_2Te_3)_{0.7}In_{0.3}$ |
| | c | Sn | " | $(Sb_2Te_3)_{0.7}Sn_{0.3}$ |
| | d | Pb | " | $(Sb_2Te_3)_{0.7}Pb_{0.3}$ |
| Present invention | e | Ge | " | $(Sb_2Te_3)_{0.7}Ge_{0.3}$ |
| Comparative | f | None | " | $(Sb_2Te_3)$ |

Each recording medium as obtained above was subjected to heat treatment at temperatures of 50° to 250° C. for about 10 minutes. Light transmittance of each recording medium treated at each temperature was measured at a wave length of 830 nm.

With respect to each recording medium, the transmittance ratio [the ratio of the transmittance of the recording medium after treatment at each temperature (T) to that before heat treatment (To)] was obtained from the above-obtained data, and, then, there was determined the relationship between the transmittance ratio and the treating temperature. The results are shown in FIG. 2.

Figure 2:
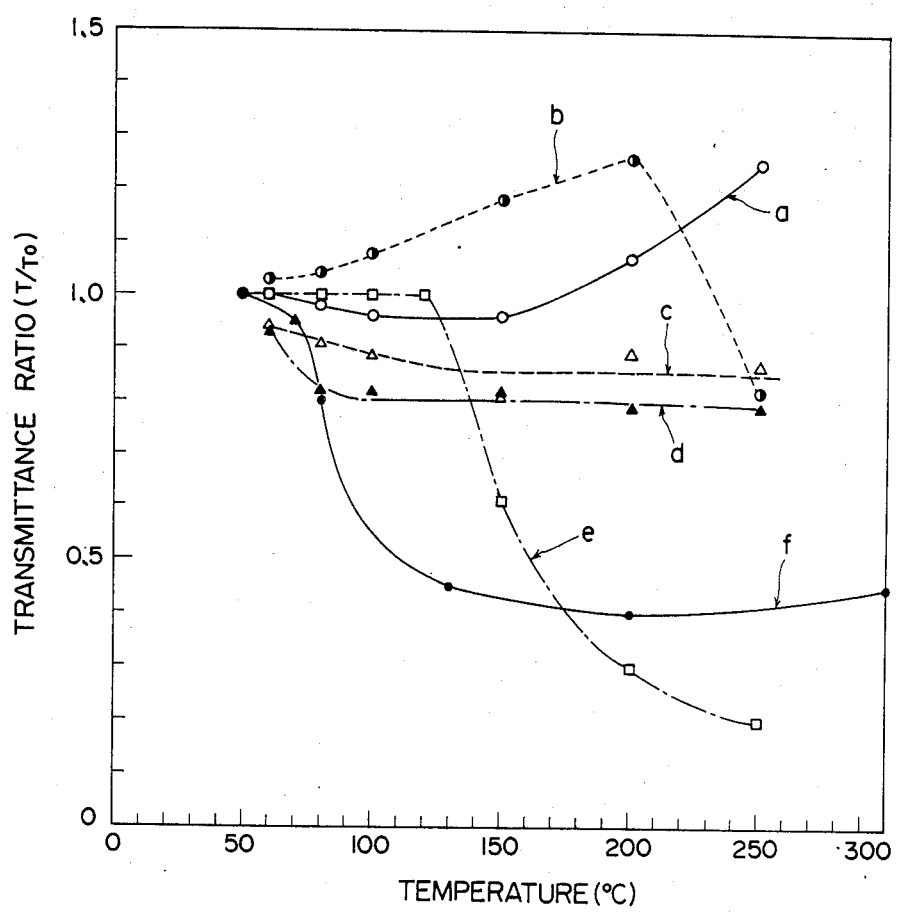
FIG. 2 is a graph showing the relationship between the transmittance ratio [the ratio of transmittance after heating (T) to that before heating (To)] and the heating temperature of the recording medium obtained in Example 1 as will be given later, shown in comparison with those of the recording media obtained in Comparative Example 1 as will be given later.

As seen in FIG. 2, the temperature at which the change in transmittance of Recording Medium e (i.e. recording medium of the present invention of which the film on the slide glass comprises Sb, Te and Ge) begins is about 80° C. higher than that with respect to Recording Medium f of which the film on the substrate contains Sb and Te but does not contain Ge. Further, the degree of change in transmittance of Recording Medium e at 250° C. is greater than that of Recording Medium f at 250° C. In view of the above, among the various recording media listed in Table 2, only a Recording Medium e of which the recording layer contains Ge in addition to $Sb_2Te_3$ is expected to have an excellent thermal stability and a high S/N ratio. The other recording media in Table 3 in which the other kind of metal is incorporated in addition to $Sb_2Te_3$ exhibited almost no change in transmittance by heat treatment (Recording Media c and d), or disadvantageously exhibited irregular changes (Recording Media a and b). This shows that such recording media cannot be advantageously used as a recording medium for use in the optical constant change system.

EXAMPLE 2 AND COMPARATIVE EXAMPLE 2

Sb, Te and Ge were separately put in heating vaporization boats. Then, Sb, Te and Ge were simultaneously deposited on slide glasses having a thickness of 1.2 mm by the resistance heating method under $1 \times 10^{-6}$ to $5 \times 10^{-5}$ Torr to form 300 Å-thick films having the compositions as shown in Table 3 given below. Thus, there were obtained Recording Media A, B, C, D, E, F, G and H as shown in Table 3 given below.

For comparison, a recording medium (Recording Medium I) was prepared by depositing on the slide glass an Sb$_2$Te$_3$ alloy from a heating vaporization boat to form a 300 Å-thick film.

TABLE 3

| Recording Medium | | Film formed on the slide glass | | | | |
|---|---|---|---|---|---|---|
| | | Sb content (% in number of atoms) | Te content (% in number of atoms) | Ge content (% in number of atoms) | Film composition (Sb$_X$Te$_{1-X}$)$_Y$Ge$_{1-Y}$ | |
| | | | | | X | Y |
| Present invention | A | 35 | 55 | 10 | 0.39 | 0.9 |
| | B | 35 | 45 | 20 | 0.44 | 0.8 |
| | C | 30 | 40 | 30 | 0.43 | 0.7 |
| | D | 20 | 40 | 40 | 0.33 | 0.6 |
| | E | 20 | 30 | 50 | 0.40 | 0.5 |
| | F | 10 | 30 | 60 | 0.25 | 0.4 |
| | G | 15 | 15 | 70 | 0.50 | 0.3 |
| | H | 8 | 12 | 80 | 0.40 | 0.2 |
| Comparative | I | 40 | 60 | 0 | 0.40 | 1.0 |

Each recording medium as prepared above was subjected to heat treatment at temperatures of 50° to 250° C. for about 10 minutes. Light transmittance of the recording medium treated at each temperature was measured at a wave length of 830 nm.

With respect to each recording medium, the transmittance ratio [the ratio of the transmittance of the recording medium after heat treatment at each temperature (T) to that before heat treatment (To)] was obtained from the above-obtained data, and, then, there was determined the relationship between the transmittance ratio and the treating temperature. The results are shown in FIG. 3.

Figure 3:
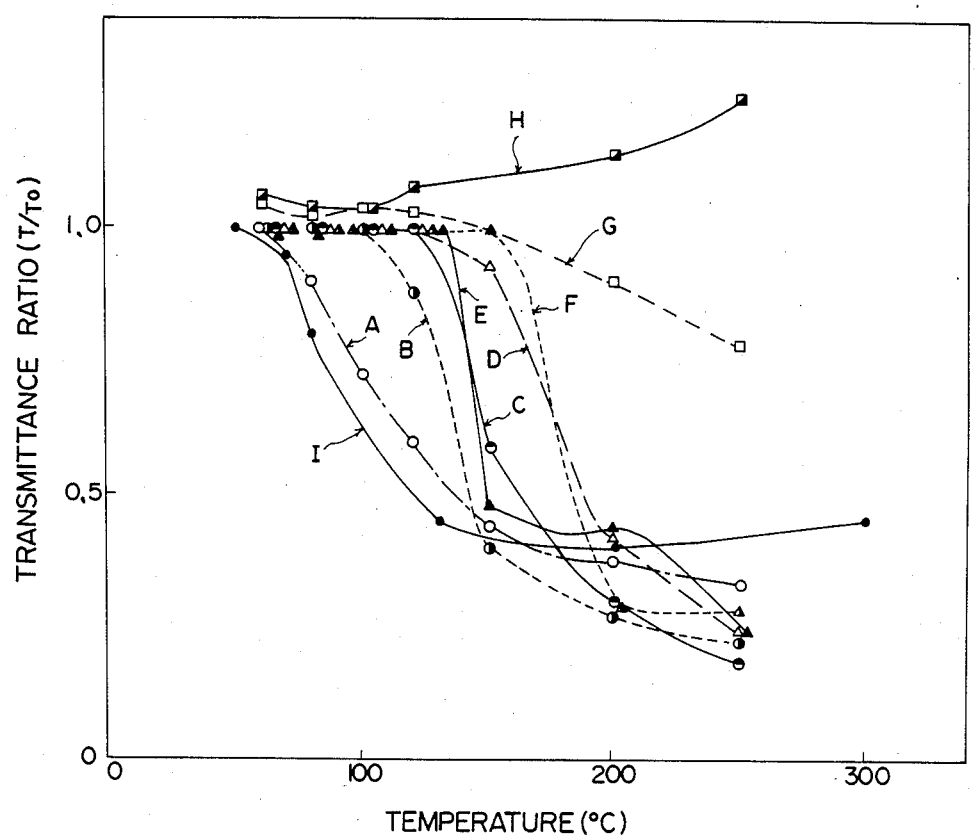
FIG. 3 is a graph showing the relationship between the transmittance retio [the ratio of transmittance after heating (T) to that before heating (To)] and the heating temperature of the recording media obtained in Example 2 as will be given later, shown in comparison with that of the recording medium obtained in Comparative Example 2 as will be given later.

As seen in FIG. 3, when the Ge content of the film formed on the slide glass is 60% or less in number of atoms, the minimum temperature at which the change in transmittance of the recording medium occurs is shifted to higher temperatures as the Ge content of the film is increased, but the degree of change in transmittance of the recording medium at 250° C. is great regardless of the Ge content of the film on the slide glass.

Optical characteristics of Recording Medium D were determined before and after heat treatment. As a result, it was found that a refractive index of 4.4 and an extinction coefficient of 1.6 which are the values before heat treatment changed to 4.2 and to 4.0, respectively, after heating treatment at 250° C. Namely, by the heat treatment the refractive index changed little, while the extinction coefficient changed greatly.

In the same manner as mentioned above, there were prepared Recording Media A, B, C, D, E, F, G, H and I again for thermal stability tests. Each recording medium as prepared above was put in a drying oven kept at 80° C. and allowed to stand in the oven for 7 days. Thereafter, each recording medium was subjected to measurement of transmittance.

From the above-obtained data was obtained the transmittance ratio [the ratio of transmittance of the recording medium after treatment (T7) to that before treatment (To)]. Then, there was determined the relationship between the transmittance ratio and the Ge content of the film formed on the slide glass. The results are shown in FIG. 4.

Figure 4:
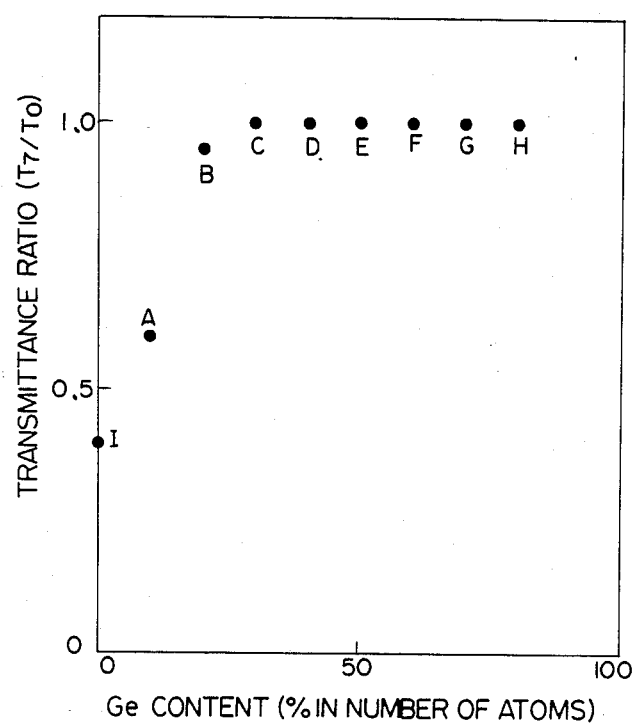
FIG. 4 is a graph showing the relationship between the transmittance ratio [the ratio of transmittance after allowing to stand at 80° C. for seven days ($T_7$) to that before allowing to stand (To)] and the Ge content of the recording media obtained in Example 2 as will be given later, shown in comparison with that of the recording medium obtained in Comparative Example 2 as will be given later.

As seen in FIG. 4, recording media of which the films on the slide glasses contain Ge in an amount of 20% or more in number of atoms exhibited little change in transmittance by heat treatment at 80° C. for 7 days, and, hence, have an excellent thermal stability.

EXAMPLE 3

Substantially in the same manner as in Example 2, 300 Å-thick films having compositions as shown in Table 4 were prepared on slide glasses having a thickness of 1.2 mm.

TABLE 4

| Recording Medium | Film formed on the slide glass Film composition (Sb$_X$Te$_{1-X}$)$_Y$Ge$_{1-Y}$ | |
|---|---|---|
| | X | Y |
| A' | 0 | 0.8 |
| B' | 0.1 | 0.8 |
| C' | 0.2 | 0.8 |
| D' | 0.3 | 0.8 |
| E' | 0.55 | 0.8 |
| F' | 0.75 | 0.8 |
| G' | 0 | 0.5 |
| H' | 0.1 | 0.5 |
| I' | 0.2 | 0.5 |
| J' | 0.3 | 0.5 |
| K' | 0.75 | 0.5 |

Each recording medium as prepared above was subjected to heat treatment in an oven kept at 200° C. for 10 minutes. Thereafter, each recording medium was subjected to measurement of light transmittance at a wave length of 830 nm. From the above-obtained data was obtained the transmittance ratio [the ratio of transmittance of the recording medium after heat treatment (T) to that before heat treatment (To)]. Then, there was determined the relationship between the transmittance ratio and the value of X in the composition represented by the formula (Sb$_X$Te$_{1-X}$)$_Y$Ge$_{1-Y}$. The results are shown in FIG. 5.

Figure 5:
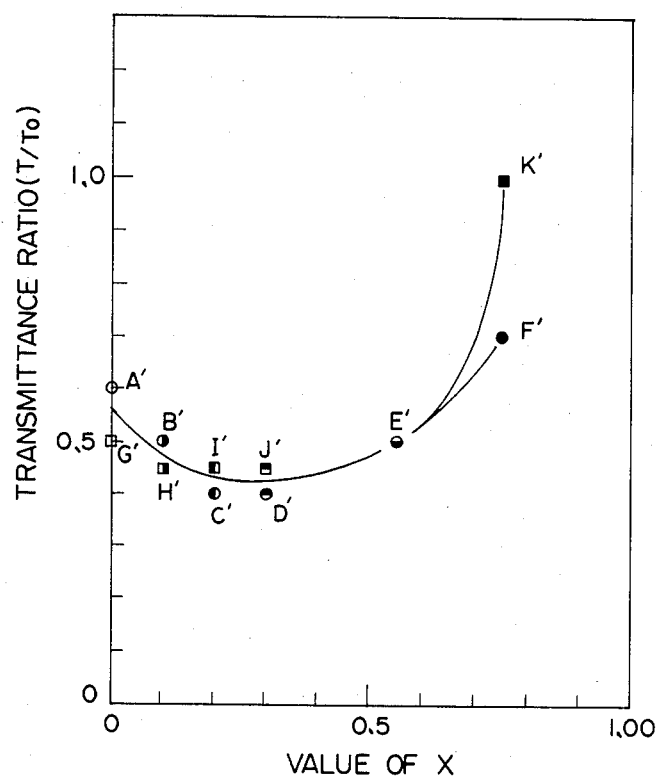
FIG. 5 is a graph showing the relationship between the transmittance ratio (the ratio of transmittance after heating (T) to that before heating (To)] and the value of X in the formula $(Sb_X Te_{1-X})_Y Ge_{1-Y}$ wherein $Y=0.5$ and 0.8, which formula defines the compositions of the recording layers of the recording media obtained in Example 3 as will be given later.

As seen in FIG. 5, in the case of recording media of which the films on the slide glasses contain Sb, Te and Ge, remarkable changes in transmittance are observed at an X value of 0.7 or less as opposed to the case where the film contains Sb and Te but no Ge.

In the same manner as mentioned above, there were prepared Recording Media A', B', C', D', E', F', G', H', I', J', and K', again. Each recording medium as prepared above was allowed to stand in a thermohygrostat kept at a temperature of 50° C. and a relative humidity of 90% for ten days. Thereafter, each sample was subjected to measurement of light transmittance. As a result, it was found that the transmittances of Recording Media A' and G' were increased to about 2 times the transmittance before treatment, and to about 1.5 times the transmittance before treatment, respectively. The increases in transmittance are considered to be ascribed to oxidation of Te. On the other hand, the recording media other than Recording Media A' and G' exhibited little change in transmittance by the treatment.

The above results show that when the value of X is 0.05 to 0.7, the recording medium not only exhibits a great change in transmittance by heat treatment but also is excellent in thermal and humid stabilities.

EXAMPLE 4

A polymethylene methacrylate disk (hereinafter often referred to as "acrylic plate") having a diameter of 305 mm and a thickness of 1.5 mm prepared by the injection molding method was so set in a vacuum deposition equipment that the acrylic plate could be rotated in the central portion of the equipment. The equipment included, around the axis of rotation, three heating vaporization boats and an electron beam apparatus having five crucibles. Sb, Te and Ge were separately put in the heating vaporization boats. The equipment was evacuated to a vacuum of $2\times10^{-6}$ Torr and the plate was subjected to simultaneous deposition of Sb, Te and Ge from the three boats while rotating the plate at 120 rpm to form a 600 Å-thick film having a composition of $Sb_{0.2}Te_{0.4}Ge_{0.4}$ (X, 0.33; Y, 0.60). Thus, there was obtained Recording Medium J.

Substantially the same procedures as mentioned above were repeated to prepare further three recording media, except that the thicknesses of the films formed on the plates were 800 Å (Recording Medium K), 1000 Å (Recording Medium L) and 1500 Å (Recording Medium M), respectively.

A semiconductor laser (wave length: 830 nm) was concentrated and applied to each recording medium as prepared above from the side of the plate while rotating the plates at 900 rpm to effect recording of signals of 1.5 MHz. In this connection, the recording power of the laser was changed to determine a phase jitter [Philips Tech. Review, Vol. 40, 157(1982)]. Then, from the relationship between the recording power and the phase jitter, there was determined a recording power of the laser at which the phase jitter became the minimum. This recording power is hereinafter referred to as "optimal intensity". The optimal intensities of the recording media were 4 mW (Recording Medium J), 3 mW (Recording Medium K), 3.5 mW (Recording Medium L) and 4 mW (Recording Medium M) on the surface of the recording layer. That is, each recording medium had a sensitivity (optimal intensity) sufficient for practical use.

For readout of the recorded information, was applied a semiconductor laser beam (wave length: 830 nm) at an intensity of 1.2 mW. The C/N ratios of signals were 30 dB (Recording Medium J), 50 dB (Recording Medium K), 53 DB (Recording Medium L) and 50 dB (Recording Medium M) at a band width of 30 KHz.

The above recording media were allowed to stand in a dryer kept at 80° C. for 7 days, and, thereafter, subjected to measurement of reflectivity. As a result, there was observed no change in reflectivity and in C/N ratio with respect to each recording medium.

Figure 6:
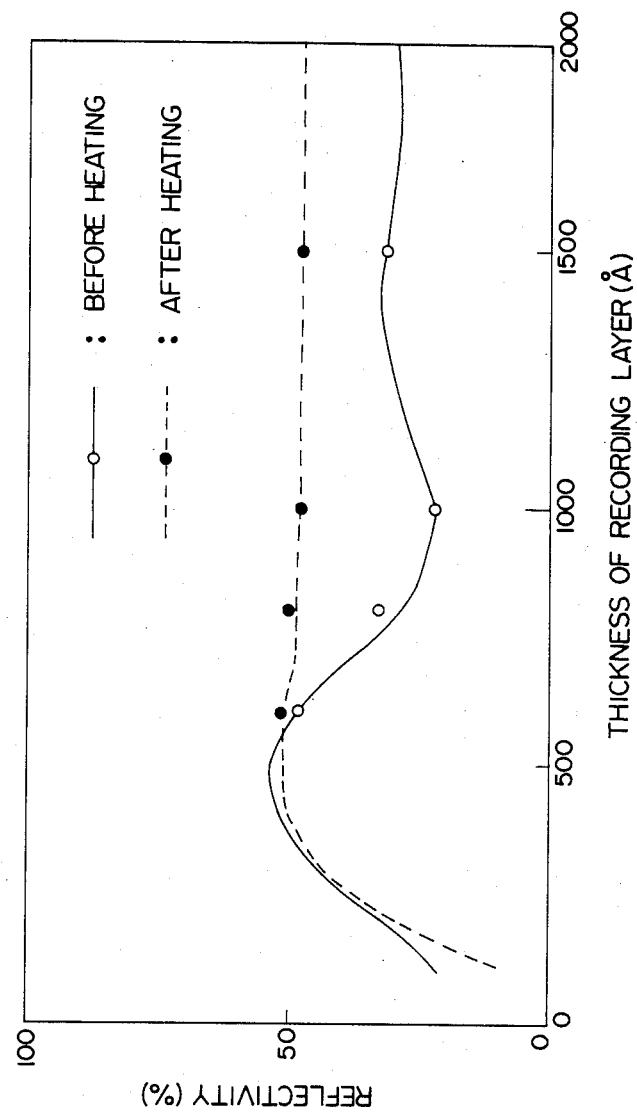
FIG. 6 is a graph showing the relationship between the reflectivity and the thickness of recording layer of the recording media obtained in Example 4 as will be mentioned later.

Separately, the reflectivity of each recording medium was measured. Then, each recording medium was subjected to heat treatment at 250° C., and, thereafter, subjected to measurement of reflectivity. The results are shown in FIG. 6. In FIG. 6, the open and closed circles show experimental results, while the solid line and dotted line are the theoretical curves prepared using the values obtained by calculation from the data with respect to the refractive index and extinction coefficient obtained in Example 2.

EXAMPLE 5

Figure 7:
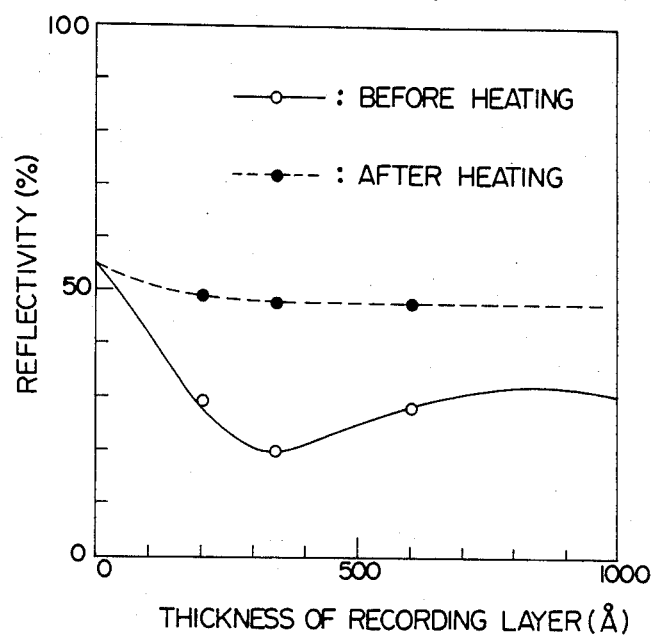
FIG. 7 is a graph showing the relationship between the reflectivity and the thickness of recording layer of the recording media obtained in Example 5 as will be given later.

On slide glasses having a thickness of 1.2 mm were simultaneously deposited Sb, Te and Ge from three heating vaporization boats respectively containing Sb, Te and Ge by the resistance heating method under $1\times10^{-6}$ to $5\times10^{-5}$ Torr to from films having a composition of $Sb_{0.12}Te_{0.48}Ge_{0.4}$ (X, 0.2; Y, 0.6) in thicknesses of 200 Å, 350 Å and 600 Å. Thereafter, a 1000 Å-thick film of Sb was further deposited on the above-formed films by the resistance heating method. The resulting recording media were subjected to measurement of reflectivity from the side of the slide glass at a wave length of 830 nm. Then, the recording media were subjected to heat treatment in an oven kept at 200° C. for about 10 minutes and, thereafter, subjected to measurement of reflectivity. The reflectivity measured before and after heat treatment are shown in FIG. 7. In FIG. 7, the open and closed circles show experimental results, while the solid line and the dotted line are the theoretical curves prepared using the values obtained by calculation from the data with respect to the refractive index and extinction coefficient obtained in Example 2. As seen in FIG. 7, when the thickness of the film on the slide glass is around 350 Å, the highest degree of contrast of reflectivity can be attained.

Figure 8:
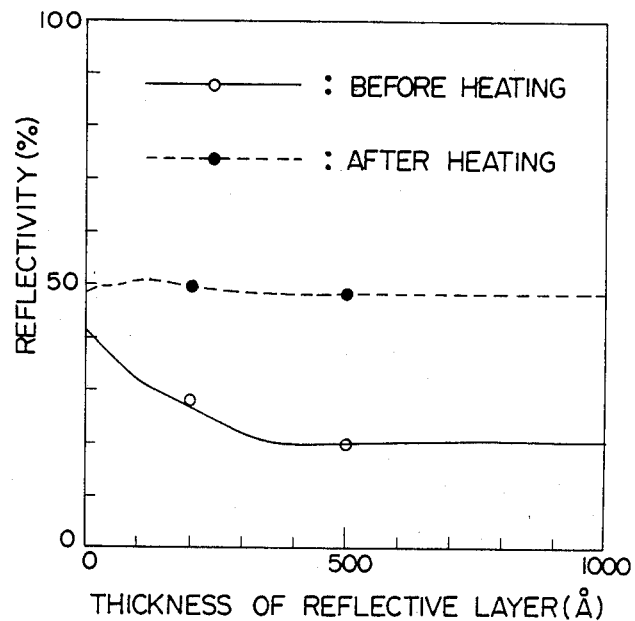
FIG. 8 is a graph showing the relationship between the reflectivity and the thickness of reflective layer of the recording media obtained in Example 5 as will be given later.

Meanwhile, Sb, Te and Ge were simultaneously deposited on two slide glasses each having a thickness of 1.2 mm by the resistance heating method under $1\times10^{-6}$ to $1\times10^{-5}$ Torr to form 350 Å-thick film having a composition of $Sb_{0.12}Te_{0.48}Ge_{0.4}$. Thereafter, a 200 Å-thick film of Sb and a 500 Å-thick film of Sb were deposited on the above-formed films, respectively, by the resistance heating method under $1\times10^{-6}$ to $5\times10^{-5}$ Torr. The thus obtained recording media were subjected to measurement of reflectivity from the side of the slide glass. Then, the recording media were subjected to heat treatment at 200° C. for 10 min and, thereafter, subjected to measurement of reflectivity. The reflectivity measured before and after heat treatment are shown in FIG. 8. In FIG. 8, the open and closed circles show experimental results, while the solid line and dotted line are the theoretical curves prepared using the values obtained by calculation from the data with respect to the refractive index and extinction coefficient obtained in Example 2.

Further, two recording media were prepared as follows. Sb, Te and Ge were simultaneously deposited on the same acrylic plate as used in Example 4 by the resistance heating method under $1\times10^{-6}$ to $1\times10^{-5}$ Torr to form a 350 Å-thick film having a composition of $Sb_{0.12}Te_{0.48}Ge_{0.4}$. Thereafter, a 200 Å-thick film of Sb and a 500 Å-thick film of Sb were deposited on the above-formed films, respectively, by the resistance heating method under $1\times10^{-6}$ to $5\times10^{-5}$ Torr. The thus obtained recording media were subjected to the determination of sensitivity and C/N ratio in the same manner as in Example 4. The recording medium of which the reflective layer had a thickness of 200 Å had an optimal intensity of 4 mW and a C/N ratio of 60 dB. On the other hand, the recording medium of which the reflective layer had a thickness of 500 Å had an optimal sensitivity of 5.5 mW and a C/N ratio of 58 dB. These recording media exhibited no change in sensitivity, C/N ratio and reflectivity even after they had been allowed to stand a dryer kept at 60° C. for 10 days.

EXAMPLE 6

On an acrylic disk plate having a thickness of 1.5 mm and a diameter of 305 mm provided with grooves (having a depth of 700 Å, a width of 0.5 μm and a pitch of 1.6 μm) previously formed by the injection molding method, were simultaneously deposited Sb, Te and Ge from three heating vaporization boats respectively containing Sb, Te and Ge by the resistance heating method to form a 300 Å-thick film having a composition of $Sb_{0.25}Te_{0.45}Ge_{0.3}$. On the formed film was further provided a 200 Å-thick Al film by the resistance heating method. The provision of the Al film was carried out in such a manner that after completion of the co-deposition of Sb, Te and Ge, the vacuum equipment was restored to atmospheric pressure, the boat employed for deposition of Ge was taken out and a fresh boat containing Al was set, and, thereafter, the equipment was evacuated to a vacuum of about $2 \times 10^{-6}$ Torr to effect vacuum deposition of Al.

The thus obtained recording medium was evaluated in substantially the same manner as in Example 4. As a result, it was found that the recording medium had an optimal intensity of 7.0 mW and a C/N ratio of 60 dB.

This recording medium exhibited no change in optimal intensity, C/N ratio and reflectivity even after they had been allowed to stand in a dryer kept at 60° C. for 10 days.

Figure 9:
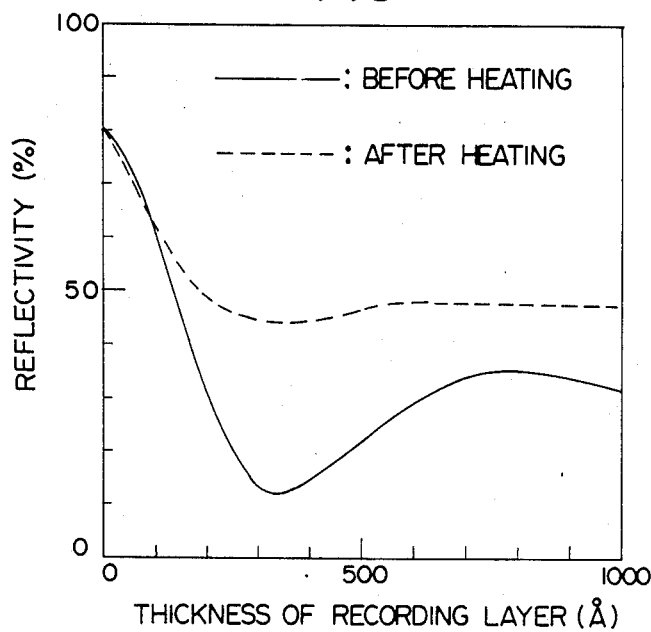
FIG. 9 is a graph showing the relationship between the reflectivity and the thickness of recording layer of the recording media obtained in Example 6 as will be given later.

With respect to a recording medium comprising a 1.2 mm thick slide glass, superimposed thereon in the following order, a recording layer having a compositin of $Sb_{0.25}Te_{0.45}Ge_{0.3}$ and a reflective layer of a 500 Å-thick Al film, there was detemined the relationship between the reflectivity of the recording medium and the thickness of the recording layer by calculation from the data with respect to the refractive index and extinction coefficient obained in Example 2. The results are shown in FIG. 9. As seen in FIG. 9, the maximum change in reflectivity of the recording medium by heat treatment can be obtained in the case of a recording medium of which the recording layer has a thickness of about 300 Å.

Figure 10:
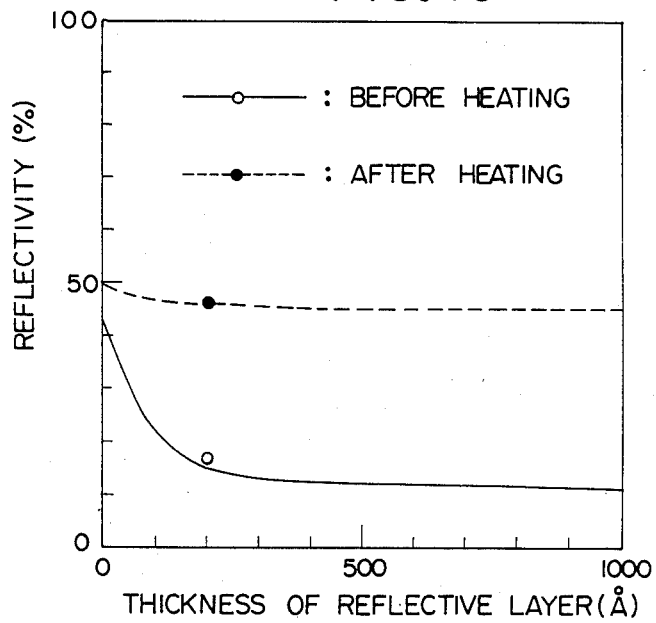
FIG. 10 is a graph showing the relationship between the reflectivity and the thickness of reflective layer of the recording media obtained in Example 6 as will be given later.

Subsequently, a recording medium was prepared in substantially the same manner as mentioned above, except that a slide glass having a thickness of 1.2 mm was used as a substrate instead of the acrylic plate. The thus obtained recording medium was subjected to measurement of reflectivity. Then, the recording medium was allowed to stand in an oven kept at 200° C. for 10 min. and, thereafter, subjected to measurement of reflectivity. The results are shown in FIG. 10. In FIG. 10, the open and closed circles show experimental results, while the solid line and dotted line show the theoretical corves prepared using the values obtained by calculation from the data with respect to the refractive index and extinction coefficient obtained in Example 2.

EXAMPLE 7 AND COMPARATIVE EXAMPLE 3

On the same acrylic plate as used in Example 6 was co-deposited $Sb_2Te_3$ in an amount corresponding to a 200 Å-thick film and Ge in an amount corresponding to a 100 Å-thick film from two heating vaporization boats respectively containing $Sb_2Te_3$ and Ge by the resistance heating method to form a recording layer. A 200 Å-thick Sb film was deposited as a reflective layer on the recording layer by the electron beam deposition method. Thus, there was obtained a recording medium.

Another recording medium was prepared in substantially the same manner as mentioned above, except that a 200 Å-thick film of $Bi_2Te_3$ instead of a 200 Å-thick film of Sb was deposited as the reflective layer on the recording layer. Incidentally, in the aboveprepared recording media, Sb, Te and Ge were present in the recording layer in a composition in terms of number of atoms represented by the formula $(Sb_XTe_{1-X})_YGe_{1-Y}$ wherein X is about 0.4 and Y about 0.6.

For comparison, in substantially the same manner as mentioned above, there was prepared a comparative recording medium comprising the same acrylic plate as used above and, superimposed thereon in the following order, a 300 Å-thick film of $Sb_2Te_3$ and a 200 Å-thick film of Sb. In the thus prepared comparative recording medium, the ratio of Sb to Te in the recording layer was substantially 2:3.

The above-prepared three recording media were evaluated in substantially the same manner as in Example 4, except that a signal of 3 MHz was recorded. As a result, the recording medium having an Sb reflective layer exhibited a reflectivity of 27%, an optimal intensity of 5 mW and a C/N ratio of 60 dB, the recording medium having a $Bi_2Te_3$ reflective layer exhibited a reflectivity of 30%, an optimal intensity of 3.5 mW and a C/N ratio of 57 dB, and the comparative recording medium exhibited a reflectivity of 25%, an optimal intensity of 4.5 mW and a C/N ratio of 60 dB.

Subsequently, the three recording media were allowed to stand in a dryer kept at 60° C. for 7 days, and then subjected to evaluation. As a result, the two recording media of the present invention underwent no change in threshold intensity, C/N ratio and reflectivity. On the other hand, the comparative recording medium changed greatly in reflectivity from 25% (value before treatment) to 40%, and decreased greatly in C/N ratio from 60 dB (value before treatment) to 20 dB.

EXAMPLE 8

On a reinforced glass disk having a thickness of 1.5 mm and a diameter of 305 mm and provided with grooves (having a depth of 700 Å, a width of 06. μm and a pitch of 1.6 μm) previously formed using a photocurable polymer were simultaneously deoposited Sb, Te and Ge from three heating vaporization boats respectively containing Sb, Te and Ge by the resistance heating method to form a 400 Å-thick film having a composition of $Sb_{0.15}Te_{0.35}Ge_{0.5}$ (X, 0.3;Y, 0.5). On the formed film was further formed a 300 Å-thick Bi film as a reflective layer by the resistance heating method.

The thus obtained recording medium was evaluated in substantially the same manner as in Example 7. As a result, it was found that the recording medium had a reflectivity of 22%, an optimal intensity of 6 mW and a C/N ratio of 58 dB. The recording medium underwent no change in an optimal intensity, C/N ratio and reflectivity even after the medium had been allowed to stand in a dryer kept at 80° C. for 10 days.

EXAMPLE 9

On the same acrylic plate as used in Example 6 were simultaneously deposited Sb, Te and Ge by the resistance heating method to form as a recording layer a 300 Å-thick film having a composition of $(Sb_XTe_{1-X})_YGe_{1-Y}$ wherein X=0.1 and Y=0.6. on the film was deposited a 200 Å-thick film of Sb as a reflective layer. Thus, there was obtained a recording medium.

Further, two recording media were prepared in substantially the same manner as mentioned above, except that the value of X with respect to the composition of the recording layer was changed to 0.2 in one recording medium and to 0.3 in the other recording medium.

Each of the above-prepared recording media was evaluated in substantially the same manner as in Example 7. As a result, it was found that the recording medium having a recording layer of which the composition had an X value of 0.1 had an optimal intensity of 3.5 mW and a C/N ratio of 60 dB, the recording medium having a recording layer of which the compositon had an X value of 0.2 had an optimal intensity of 4 mW and a C/N ratio of 60 dB, and the recording medium having a recording layer of which the composition had an X value of 0.3 had an optimal intensity of 4.5 mW and a C/N ratio of 60 dB.

Subsequently, the three recording media were exposed to accelerated deteriorating conditions (temperature, 60° C.; relative humidity, 82%) for 7 days. Thereafter, with respect to each recording medium, readout of the recorded signals was effected. As a result, it was found that each recording medium underwent no deterioration with respect to C/N ratio.

EXAMPLE 10

On the same acrylic disk as used in Example 6 was formed a 200 Å-thick film of $SiO_2$ as a first metallic compound layer by the electron beam deposition method. Subsequently, on the formed film were simultaneously deposited Sb, Te and Ge from three heating vaporization boats respectively containing Sb, Te and Ge by the resistance heating method to form as a recording layer a 1000 Å-thick film having a composition of $Sb_{0.15}Te_{0.45}Ge_{0.4}$ (X, 0.25; Y, 0.60). Thereafter, a 200 Å-thick film of $SiO_2$; was further formed as a second metallic compound layer on the recording layer by the electron beam deposition method. Thus, there was obtained a recording medium.

A semiconductor laser beam (wave length: 830 nm) was concentrated and applied to the recording medium from the side of the plate while rotating the medium at 900 rpm to effect recording of information signals on the disk at a portion which is about 140 mm distant from the center of the disk. In this connection, a pulse sequence of single frequency (3.1 MHz) according to $M^2FM$ modulation system was employed as information signals. Readout of the recorded signal was carried out at 1.2 mW using a semiconductor laser having the same wave length, and compared with the recorded information signal to determine a bit error rate. As a result, it was found that the optimal intensity and bit error rate (hereinafter referred to as "BER") of the recording medium were 4.0 mW and $3 \times 10^{-5}$, respectively.

Subsequently, the recording medium was exposed to accelerated deteriorating conditions (temperature, 60° C.; relative humidity, 90%) for 10 days and, thereafter, subjected to determination of BER. As a result, it was found that BER was slightly increased to $5 \times 10^{-5}$.

EXAMPLE 11

On the same acrylic plate as used in Example 6 were deposited, in the following order, a 400 Å-thick film of $Si_3N_4$ as a first metallic compound layer, a 350 Å-thick film having a composition of $Sb_{0.15}Te_{0.5}Ge_{0.35}$ (X, 0.23; Y, 0.65), a 250 Å-thick film of Sb as a reflective layer and a 400 Å-thick film of $Si_3N_4$ as a second metallic compound layer by the sputtering method. Thus, there was obtained a recording medium. The recording medium was evaluated in substantially the same manner as in Examples 10. As a result, the recording medium had a BER of $2 \times 10^{-6}$, an optimal intensity of 4.5 mW and a C/N ratio of 60 dB. Subsequently, the recording medium was exposed to accelerated deteriorating conditions (temperature, 60° C., relative humidity, 90%) for 20 days and, thereafter, subjected to determination of BER. As a result, it was found that there was no change in BER ($2 \times 10^{-6}$).

EXAMPLE 12

On the same acrylic plate as used in Example 6 was deposited a 400 Å-thick SiO film as a first metallic compound layer by the electron beam deposition method. On the first metallic compound layer was deposited as a recording layer a 350 Å-thick film having a composition of $Sb_{0.15}Te_{0.45}Ge_{0.4}$ (X, 0.25; Y, 0.6) by the resistance heating method. Then, a 200 Å-thick film of Sb was deposited as a reflective layer on the recording layer by the electron beam deposition method. Subsequently, a 600 Å-thick film of SiO was deposited as a second metallic compound layer on the reflective layer. Thus, there was obtained a recording medium.

The recording medium was evaluated substantially in the same manner as in Example 10. As a result, it was found that the recording medium had a BER of $1 \times 10^{-6}$, an optimal intensity of 4.5 mW and a C/N ratio of 60 dB. Then, a laser beam was continuously irradiated at an intensity of 1.2 mW onto a track (grooves on the plate) having information recorded thereon to effect readout over a period of 10 days. Even after the regeneration for 10 days there was observed no change in BER.

Subsequently, the recording medium was exposed to accelerated deteriorating conditions (temperature, 60° C.; relative humidity, 90%) for 20 days and, thereafter, subjected to determination of BER. As a result, it was found that there was caused no change in BER ($1 \times 10^{-6}$).

EXAMPLE 13

On the same acrylic plate as used in Example 6 was deposited a 500 Å-thick $SiO_2$ film as a first metallic compound layer by the electron beam deposition method. On the first metallic compound layer was formed as a recording layer a 400 Å-thick film having a composition of $Sb_{0.2}Te_{0.45}Ge_{0.35}$ (X, 0.31; Y, 0.65). In forming the recording layer, Sb and Te were deposited by the electron beam deposition method and Ge by the resistance heating method. Then, a 300 Å-thick film of Sb was deposited as a reflective layer on the recording layer by the electron beam deposition method. Subsequently, a 500 Å-thick film of $SiO_2$ was deposited as a second metallic compound layer on the reflective layer by the electron beam deposition method. Thus, there was obtained a recording medium.

The recording medium was evaluated substantially in the same manner as in Example 10. As a result, it was found that the recording medium had a BER of $1 \times 10^{-6}$, an optimal intensity of 5 mW and a C/N ratio of 58 dB. Then, the recording medium was exposed to accelerated deteriorating conditions (temperature, 60° C. and relative humidity, 90%) for 20 days and, thereafter, subjected to determination of BER. As a result, it was found that there was caused no change in BER ($1 \times 10^{-6}$).

EXAMPLE 14

On an acrylic plate having a thickness of 1.5 mm and provided with grooves (depth, 700 Å; width, 0.65 μm; pitch, 1.6 μm) which had been formed by injection molding was formed as a recording layer a 500 Å-thick film having a composition of $Sb_{0.20}Te_{0.35}Ge_{0.45}$ by simultaneous high frequency sputtering, using targets of $Sb_2Te_3$ and Ge. Then, a 100 Å-thick film of Sb was deposited on the recording layer from a boat containing Sb by the resistance heating method. Thus, there was obtained a recording medium. A semiconductor laser (wave length: 830 nm) was concentrated and applied to the recording medium from the side of the plate to effect recording of signals of 1.5 MHz while rotating the medium at 600 rpm. The optimal intensity was 5 mW as measured on the recording layer.

Readout of signals was carried out with a semiconductor laser beam at an intensity of 1.2 mW. As a result, it was formed that the C/N ratio of the recording medium was 58 dB.

Subsequently, the recording medium was exposed to accelerated deteriorating conditions (temperature, 60° C.; relative humidity, 80%) for 7 days and, thereafter, subjected to determination of optimal intensity and C/N ratio. As a result, it was found that there was caused no change in optimal intensity and C/N ratio.

EXAMPLE 15

On a reinforced glass disk plate having a thickness of 1.5 mm and a diameter of 305 mm and provided with grooves (depth, 700 Å; width, 0.6 μm; pitch, 1.6 μm) which had been formed using a photocurable polymer, were deposited $Sb_2Te_3$ and Ge from two boats made of Ta respectively containing $Sb_2Te_3$ and Ge by the resistance heating method under $2 \times 10^{-6}$ Torr to form a 600 Å-thick film as a recording layer. On the recording layer was further deposited as a reflective layer a 100 Å-thick Al film by the resistance heating method. Thus, there was obtained a recording medium.

The recording medium was evaluated in substantially the same manner as in Example 14. As a result, it was found that the recording medium had an optimal intensity of 6.5 mW, a C/N ratio of 60 dB and a reflectivity of 31%. The recording medium exhibited no change in optimal intensity, C/N ratio and reflectivity even after it was allowed to stand in a dryer kept at 80° C. for 10 days.

EXAMPLE 16 AND COMPARATIVE EXAMPLE 4.

On the same acrylic plate as used in Example 14 were co-deposited $Sb_2Te_3$ in an amount corresponding to a 200 Å-thick film and Ge in a amount corresponding to a 100 Å-thick film from two heating vaporization boats respectively containing $Sb_2Te_3$ and Ge by the resistance heating method to form a recording layer. A 200 Å-thick Sb film was deposited as a reflective layer on the recording layer by the resistance heating deposition method. Thus, there was obtained a recording medium of the present invention.

Another recording medium of the present invention was prepared substantially in the same manner as mentioned above, except that a 200 Å-thick film of $Bi_2Te_3$ instead of a 200 Å-thick film of Sb was deposited as the reflective layer on the recording layer. Incidentally, in the above-prepared two recording media, Sb, Te and Ge were present in the recording layer in a composition in terms of number of atoms represented by the formula $(Sb_XTe_{1-X})_YGe_{1-Y}$ wherein X is about 0.4 and Y about 0.6.

For comparison, substantially in the same manner as mentioned above, there was prepared a comparative recording medium comprising the same acrylic plate as used above and, superimposed thereon in the following order, a 300 Å-thick film of $Sb_2Te_3$ and a 200 Å-thick film of Sb. In the thus prepared comparative recording medium, the ratio of Sb to Te in the recording layer was substantially 2:3.

The above-prepared three recording media were evaluated substantially in the same manner as in Example 4, except that a signal of 3 MHz was recorded. As a result, the recording medium of the present invention having an Sb reflective layer exhibited a reflectivity of 27%, an optimal intensity of 5 mW and a C/N ratio of 60 dB, the recording medium of the present invention having a $Bi_2Te_3$ reflective layer exhibited a reflectivity of 30%, an optimal intensity of 3.5 mW and a C/N ratio of 57 dB, and the comparative recording medium exhibited a reflectivity of 25%, an optimal intensity of 4.5 mW and a C/N ratio of 60 dB.

Subsequently, the three recording media were allowed to stand in a dryer kept at 60° C. for 7 days, and then subjected to evaluation. As a result, the two recording media of the present invention underwent no change in optimal intensity, C/N ratio and reflectivity. On the other hand, the comparative recording medium changed greatly in reflectivity from 25% (value before treatment) to 40%, and decreased greatly in C/N ratio from 60 dB (value before treatment) to 20 dB.

EXAMPLE 17

On the same acrylic plate as used in Example 14 were simultaneously deposited Sb, Te and Ge by the resistance heating method to form as a recording layer a 300 Å-thick film having a composition of $(Sb_XTe_{1-X})_YGe_{1-Y}$ wherein X=0.4 and Y=0.5. On the film was deposited a 200 Å-thick film of Sb as a reflective layer. Thus, there was obtained a recording medium.

Further, two recording media were prepared in substantially the same manner as mentioned above, except that the value of Y with respect to the composition of the recording layer was changed to 0.7 in one recording medium and to 0.9 in the other recording medium.

Each of the above-prepared recording media was evaluated substantially in the same manner as in Example 16. As a result, it was found that the recording medium having a recording layer of which the composition had a Y value of 0.5 had an optimal intensity of 5.5 mW and a C/N ratio of 58 dB, the recording medium having a recording layer of which the composition had a Y value of 0.7 had an optimal intensity of 5 mW and a C/N ratio of 60 dB, and the recording medium having a recording layer of which the composition had a Y value of 0.9 had an optimal intensity of 4.5 mW and a C/N ratio of 60 dB.

Subsequently, the three recording media were exposed to accelerated deteriorating conditions (temperature, 60° C.; relative humidity, 82%) for 7 days. Thereafter, with respect to each recording medium, Readout of the recorded signals was effected to determine the C/N ratio. As a result, it was found that the recording medium having a recording layer of which the composition had a Y value of 0.9 decreased in C/N ratio to 40 dB, but the other two recording media exhibited no change in C/N ratio.

EXAMPLE 18

On the same acrylic plate as used in Example 14 was deposited a 300 Å-thick SiO film as a first metallic compound layer by the electron beam deposition method. On the first metallic compound layer were co-deposited $Sb_2Te_3$ in an amount corresponding to a 220 Å-thick film and Ge in an amount corresponding to a 110 Å-thick film from two heating vaporization boats respectively containing $Sb_2Te_3$ and Ge by the resistance heating method to form a recording layer. Then, a 200 Å-thick film of Sb was deposited as a reflective layer on the recording layer by the electron beam deposition method. Subsequently, a 300 Å-thick film of SiO was deposited as a second metallic compound layer on the reflective layer. Thus, there was obtained a recording medium. The same procedures as mentioned above were repeated to prepare five recording media which were the same as one another.

The above-prepared five recording media were subjected to determination of optimal intensity and BER in the same manner as in Example 10.

Subsequently, the recording media were heat treated at 50° C. in an atmosphere with a relative humidity of 90% for 3 days and, thereafter, subjected to determination of optimal intensity and C/N ratio again. The results are shown in Table 5

TABLE 5

| Recording medium | Before treatment | | After treatment (50° C., 90% RH, for 3 days) | |
|---|---|---|---|---|
| | Optimal intensity | BER | Optimal intensity | BER |
| Ex. 18-1 | 4.5 mW | $7 \times 10^{-6}$ | 4.5 mW | $2 \times 10^{-6}$ |
| Ex. 18-2 | 3.0 mW | $8 \times 10^{-6}$ | 4.6 mW | $3 \times 10^{-6}$ |
| Ex. 18-3 | 3.8 mW | $5 \times 10^{-5}$ | 4.5 mW | $2 \times 10^{-6}$ |
| Ex. 18-4 | 4.3 mW | $2 \times 10^{-5}$ | 4.6 mW | $3 \times 10^{-6}$ |
| Ex. 18-5 | 4.7 mW | $1 \times 10^{-5}$ | 4.7 mW | $2 \times 10^{-6}$ |

As seen in Table 5 given above, the heat treatment under humid condition of the recording media is very effective for improvement in uniformity of the initial characteristics of the recording media, such as optimal intensity and BER.

EXAMPLE 19

On the same acrylic plate as used in Example 14 was deposited a 500 Å-thick SiO$_2$ film as a first metallic compound layer by the electron beam deposition method. On the first metallic compound layer was deposited as a recording layer a 500 Å-thick film having a composition of Sb$_{0.15}$Te$_{0.45}$Ge$_{0.4}$ (X, 0.25; Y, 0.60) by the resistance heating method. Then, a 200 Å-thick film of Sb was deposited as a reflective layer on the recording layer by the electron beam deposition method. Subsequently, a 600 Å-thick film of SiO$_2$ was deposited as a second metallic compound layer on the reflective layer. Thus, there was obtained a recording medium.

The same procedures as mentioned above were repeated to prepare five recording media which were the same as one another.

The above-prepared five recording media were subjected to determination of optimal intensity in the same manner as in Example 10.

Subsequently, the recording media heat treated at 60° C. in an atmosphere with a relative humidity of 80° C. The recording media were subjected to determination of optimal intensity 5 hours, 10 hours, one day, two days and 5 days after initiation of the treatment. The results are shown in 6.

TABLE 6

| Recording medium | Before treatment | Optimal intensity (mW) After treatment (60° C., 80% RH) | | | | |
|---|---|---|---|---|---|---|
| | | 5 hours | 10 hours | 1 day | 2 days | 5 days |
| Ex. 19-1 | 4.0 | 4.0 | 4.4 | 4.5 | 4.5 | 4.5 |
| Ex. 19-2 | 4.0 | 4.0 | 4.4 | 4.4 | 4.5 | 4.5 |
| Ex. 19-3 | 4.5 | 4.5 | 4.5 | 4.5 | 4.6 | 4.6 |
| Ex. 19-4 | 3.8 | 4.0 | 4.4 | 4.5 | 4.5 | 4.5 |
| Ex. 19-5 | 4.3 | 4.3 | 4.4 | 4.5 | 4.5 | 4.5 |

As seen in Table 6, the heat treatment under humid condition for 10 hours or longer is especially effective for improvement in uniformity of the initial characteristics of the recording media.

What is claimed is:

1. An information recording medium, for use in a system of recording information by exposing a medium to an energy beam, said medium comprising a substance capable of changing in optical extinction coefficient upon being heated, causing the exposed areas to be different in optical extinction coefficient from the non exposed areas without ablation of the medium, wherein said information recording medium comprises a substrate and superimposed thereon a recording layer composed of Sb, Te and Ge.

2. An information recording medium according to claim 1, wherein Sb, Te and Ge are present in said recording layer in a composition in terms of number of atoms represented by the formula:

$$(Sb_XTe_{1-X})_YGe_{1-Y}$$

wherein $0.05 \leq x \leq 0.7$ and $0.4 \leq Y \leq 0.8$.

3. An information recording medium according to claim 1, wherein Sb, Te and Ge are present in said recording layer in a composition in terms of number of atoms represented by the formula:

$$(Sb_XTe_{1-X})_YGe_{1-Y}$$

wherein $0.1 \leq x \leq 0.6$ and $0.4 \leq Y \leq 0.8$.

4. An information recording medium according to claim 1, wherein Sb, Te and Ge are present in said recording layer in a composition in terms of number of atoms represented by the formula:

$$(Sb_XTe_{1-X})_YGe_{1-Y}$$

wherein $0.1 \leq x \leq 0.6$ and $0.5 \leq Y \leq 0.7$.

5. An information recording medium according to claim 1, wherein Sb, Te and Ge are present in said recording layer in a composition in terms of number of atoms represented by the formula:

$$(Sb_XTe_{1-X})_YGe_{1-Y}$$

wherein $0.15 \leq x \leq 0.4$ and $0.5 \leq Y \leq 0.7$.

6. An information recording medium according to claim 1, wherein Sb, Te and Ge are present in said recording layer in a composition in terms of number of atoms represented by the formula:

$$(Sb_XTe_{1-X})_YGe_{1-Y}$$

wherein $0.1 \leq x \leq 0.35$ and $0.5 \leq Y \leq 0.7$.

7. An information recording medium according to claim 1, which further comprises a reflective layer of a metal or an alloy composed of at least two metals provided on one of the upper and lower sides of said recording layer, said recording layer and said reflective layer constituting an information supporting layer.

8. An information recording medium according to claim 7, wherein said reflective layer is a layer of a metal selected from group consisting of Al, Ti, Cr, Co, Ni, Se, Ge, Zr, Ag, In, Sn, Sb, Te, Pt, Au, Pb and Bi.

9. An information recording medium according to claim 7, said reflective layer is a layer of a metal selected from the group consisting of Sb, Te and Bi.

10. An information recording medium according to claim 7, wherein said reflective layer is a layer of an alloy containing at least one metal selected from the group consisting of Al, Ti, Cr, Co, Ni, Se, Ge, Zr, Ag, In, Sn, Sb, Te, Pt, Au, Pb and Bi.

11. An information recording medium according to claim 7, wherein said reflective layer is an alloy containing at least one metal selected from the group consisting of Sb, Te and Bi.

12. An information recording medium according to claim 1, which further comprises a layer of a metallic compound provided on at least one of the upper and lower sides of said recording layer.

13. An information recording medium according to claim 7, which further comprises a layer of a metallic compound provided on at least one of the upper and lower sides of said information supporting layer.

14. An information recording medium according to claim 12, wherein said metallic compound is at least one member selected from the group consisting of oxides and nitrides of a metal selected from Al, Cr, Si, Zr, Ti, Ge, Se, Te, V, Hf, La, Sm, Y, Ta and Mo.

15. An information recording medium according to claim 12, wherein said metallic compound is at least one member selected from the group consisting of oxides and nitrides of Si.

16. An information recording medium according to claim 13, wherein said metallic compound is at least one member selected from the group consisting of oxides and nitrides of a metal selected from Al, Cr, Si, Zr, Ti, Ge, Se, Te, V, Hf, La, Sm, Y, Ta and Mo.

17. An information recording medium according to claim 13, wherein said metallic compound is at least one member selected from the group consisting of oxides and nitrides of Si.

18. An information recording medium according to claim 1, wherein said recording layer has a thickness of 800 Å to 2,000 Å.

19. An information recording medium according to claim 7, wherein said recording layer has a thickness of 200 Å to 1,000 Å.

20. An information recording medium according to claim 7, wherein said reflective layer has a thickness of 100 Å to 1,000 Å.

21. An information recording medium according to claim 1, which has been subjected to heat treatment under humid condition.

22. An information recording medium according to claim 21, wherein said heat treatment is effected at 40° C. to 100° C. in an atmosphere with a relative humidity of 50% to 98%.

* * * * *